Figure 1:
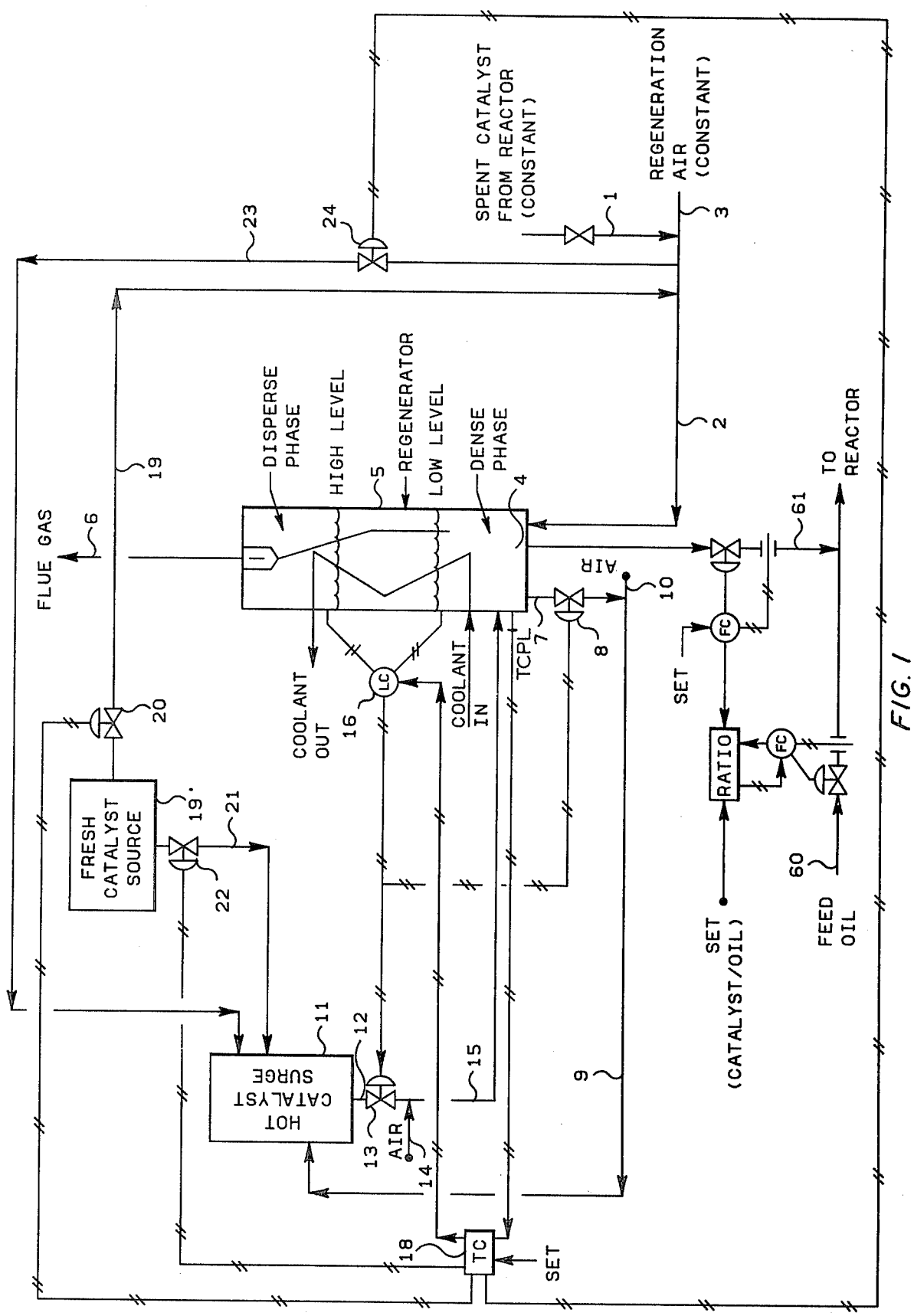

United States Patent [19]

Kelley

[11] 4,220,622

[45] Sep. 2, 1980

[54] APPARATUS FOR REGENERATION OF FLUIDIZED PARTICLES OR CATALYSTS

[75] Inventor: Carl S. Kelley, Bartlesville, Okla.

[73] Assignee: Phillips Petroleum Company, Bartlesville, Okla.

[21] Appl. No.: 9,323

[22] Filed: Feb. 5, 1979

Related U.S. Application Data

[62] Division of Ser. No. 873,580, Jan. 30, 1978, Pat. No. 4,160,743.

[51] Int. Cl.$^2$ .............................. B01J 8/24; B01J 8/26
[52] U.S. Cl. .............................. 422/109; 208/DIG. 1; 422/110; 422/144; 422/145; 422/146
[58] Field of Search .............................. 422/144–146, 422/110, 111, 106, 109, 142; 208/164, DIG. 1; 252/417

[56] References Cited
U.S. PATENT DOCUMENTS

| | | | |
|---|---|---|---|
| 2,424,147 | 7/1947 | Campbell | 208/164 X |
| 2,513,693 | 8/1950 | Jahnig | 208/164 X |
| 2,777,804 | 1/1957 | Nicolai | 208/164 |
| 2,892,773 | 6/1969 | Hirsch et al. | 422/144 X |
| 2,902,432 | 9/1969 | Codet et al. | 252/417 |
| 2,970,117 | 1/1961 | Harper | 252/417 |
| 3,004,926 | 10/1961 | Goering | 208/DIG. 1 |
| 3,213,014 | 10/1965 | Atkinson et al. | 422/110 X |
| 3,363,992 | 1/1968 | Chernak | 422/106 |
| 4,009,121 | 2/1977 | Luckenbach | 208/264 X |

Primary Examiner—Michael S. Marcus

[57] ABSTRACT

Apparatus for regenerating at elevated temperature a fluidized mass of particles, e.g., a catalyst used in treatment of hydrocarbons, e.g., fluidized catalysts cracking of oil, is disclosed.

Several operations can be effected in the apparatus, each of them alone or in various combinations.

An operation basic to the overall operation, always effected by the apparatus, is the continuous circulation of dense phase particles undergoing regeneration from a dense phase or fluidized regeneration vessel to a hot surge vessel and from the latter back into the dense phase bed in the regeneration vessel.

Used catalyst can be in part passed to the hot surge vessel whenever it is tending to cause undue temperature rise in the regeneration vessel.

Fresh or unused catalyst can be fed to the regeneration vessel continuously or intermittently responsive to sensed temperature change in said vessel and/or to said hot surge vessel.

A temperature sensing controller station resets a level controller, controlling regeneration vessel dense phase bed level by controlling the several possible flows or combinations thereof.

6 Claims, 2 Drawing Figures

APPARATUS FOR REGENERATION OF FLUIDIZED PARTICLES OR CATALYSTS

This is a divisional of application Ser. No. 873,580, filed Jan. 30, 1978, now U.S. Pat. No. 4,160,743.

This invention relates to the regeneration of a mass of fluidized particles, e.g., a contact mass or catalyst. In one of its aspects, the invention relates to the regeneration of a hydrocarbon or oil cracking catalyst which has been spent in the cracking of the hydrocarbon, e.g., a gas oil or a topped crude oil to gasoline and other products. In another of its aspects the invention relates to the burning of coke, carbon or other deposits from a used contact mass which is maintained in fluidized state during the regeneration.

More specifically the invention provides apparatus for said regeneration.

The invention is applicable to the regeneration or handling of various fluidized masses of particulate material. It is described herein respecting the regeneration of used hydrocarbon catalysts, e.g., a catalyst which has been, usually by carbon or coke laydown thereon, in the processing of a hydrocarbon, e.g., in the cracking, hydrocracking, isomerization, reforming, polymerization, etc., of a suitable hydrocarbon feed stock.

In one of its concepts the invention provides an apparatus for maintaining a continuous flow of fluidized catalysts from a regeneration to a hot catalyst surge zone and back again, so as to have a supply of catalyst at about the temperature of that in the regeneration zone ready for use whenever increased or decreased rate of heat evolution in the regeneration zone is experienced. At least the flow of catalyst to said surge zone from the regeneration zone is controlled responsive to the temperature of the catalyst in said regeneration zone to build the level of catalyst therein as the temperature tends to increase and vice versa.

In another concept the invention provides for altering the dense phase bed level responsive to its temperature by controlling the flow of the catalysts from a hot catalyst surge zone to a regeneration zone to increase said flow when temperature in said regeneration zone is tending to rise, and vice versa.

In a further concept, the last two described concepts are combined for simultaneous operation.

In another of its concepts the invention provides an apparatus for feeding used catalyst to be regenerated in part to a hot catalyst surge zone which is in continuous circulation with a regeneration zone to which another part of said used catalyst has passed, the proportion of the part being determined by and responsive to the temperature of the catalyst mass in said regeneration zone, more used catalyst being passed to said hot catalyst surge zone when the temperature in said regeneration zone is tending to rise, and vice versa.

In another concept, still, the invention provides an apparatus for feeding, intermittently or continuously, in part to said regeneration zone and in part to said hot catalyst surge zone, more or less unused or fresh catalyst, at a temperature which is below that of the mass of catalyst in the regeneration zone, responsive to the temperature of the mass of catalyst in said regeneration zone, more being fed to said regeneration zone as temperature therein tends to rise, while less may be fed to the hot catalyst surge zone, and vice versa.

In a still further concept of the invention it provides an apparatus for the operation of a combination of two or more of the recited concepts and that which maintains a level of the bed which is desired in view of tendency of the temperature thereof to change from the temperature which is desired.

In still another of its concepts the invention provides an apparatus, including in the regeneration zone of a system, as described herein, in which there is a continuous flow of catalysts undergoing regeneration in the regeneration zone from said zone to a hot catalyst surge zone, and back again, and in which there may be other flows of catalysts as described herein, a cooling coil or element disposed at least in part within the dense phase therein and controls to adjust the levels of the dense bed of catalyst responsive to its temperatures so as to, respectively, effect catalyst contact with more or less of the cooling element as the temperature increases (raising the level of the bed) and as the temperature tends to decrease (lowering the level of the bed).

In a further concept of the invention, still, in addition to such level control as described herein there is provided within the regeneration zone a set of stacked cooling elements, each of which can be furnished water and/or steam as may be required, thereby considerably minimizing the need for changing level albeit some level change is being effected.

The general kind of operations to which the invention, as described, relates can be seen in the following patents, the disclosures of which are incorporated herein by reference: U.S. Pat. Nos. 2,438,728, Mar. 30, 1948; 2,735,744, Feb. 21, 1956; 2,735,082, Feb. 21, 1956; 2,752,291, June 26, 1956; 2,756,216, July 24, 1956; 2,777,804, Jan. 15, 1957; 2,902,437, Sept. 1, 1959; 2,963,422, Dec. 6, 1960; 2,970,117, Jan. 31, 1961; and 4,009,121, Feb. 22, 1977.

The foregoing patents show the general type of fluidized catalyst system in which a catalyst is employed in fluidized condition to effect a treatment following which it is regenerated in fluidized condition. Various tubular arrangements within and without a regenerator to cool regenerated catalyst and/or to preheat feeds are shown. The varying of level of a bed of catalyst is shown. The adjustment of level by forcing a level of fluidized catalyst by back pressure into a regenerator is shown. The use of a cooler catalyst to be admixed from an external cooler with catalyst being passed to a regenerator is shown. Finally, the use of a set stacked coils within the bed of a regenerator, wherein in one coil essentially water is used and in another steam is used, which may contain some water at least initially is shown. The disclosures of the cited patents speak for themselves. No intent to interpret these disclosures is made here. The recitations are simply to show recognition of their disclosures and to aid one skilled in the art in possession of this disclosure studying the same to recall more quickly that which is available in the patent art and to more quickly recognize the essence of the concepts of invention described and claimed herein. No attempt is here made to list exhaustively the great many more patents and other art which are available in the catalyst regeneration field.

The control of the temperature at which a contact mass of particles or catalyst is regenerated is critical to preserving highest, desired activity. Especially is this seen to be so when our Country is dependent for almost 45% of its oil needs on sources outside the United States.

It is known that many catalysts are sensitive to changes of temperature at which they are being regenerated. This is especially so when regeneration temperatures are high, of the order of hundreds of degrees and when deposits thereon are being exothermically removed or burned off. Thus, a surge in the amount of carbon on a used cracking catalyst can cause a sudden undesired increase of the temperature of the regeneration being effected which can be deleterious to the catalyst. Accordingly, improved operations are to be desired.

It is an object of this invention to provide an apparatus for the treatment of a fluidized mass of solid particles, e.g., a catalyst. It is another object of this invention to provide an apparatus for regeneration of a fluidized mass of used catalyst particles. It is a further object of this invention to provide an apparatus for the regeneration of a used hydrocarbon treatment catalyst to remove undesired deposits therefrom by subjecting the same to oxidation conditions during which the temperature of the fluidized mass of particles in a regeneration bed can be effectively controlled, especially without shock to said bed or other disturbance therein due to sudden temperature variation therein.

Other aspects, concepts, objects and the several advantages of the invention are apparent from a study of this disclosure, the drawing, and the appended claims.

According to the present invention, there is provided an apparatus for regeneration of a fluidized mass of particles or catalysts, e.g., spent oil cracking catalyst, which comprises means for continuously circulating fluidized catalysts from a regeneration zone to a hot catalyst surge zone and from the bed of catalyst in said hot surge zone to said regeneration zone and controlling at least one of the just described flows responsive to the temperature in the said regeneration zone to raise the level of catalyst therein as temperature therein tends to rise, and vice versa.

Also according to the present invention means are provided for diverting the flow of used catalyst to the regeneration zone in part to said hot catalyst surge zone at least when the temperature in the regeneration zone is tending to rise, and vice versa.

Still further according to the invention, means are provided for passing fresh or unused catalyst at a temperature appreciably lower than that desired to be maintained in the regeneration zone at least in part to the regeneration zone when the temperature therein is tending to rise. When there is maintained a continuous flow thereof the rate of flow of the fresh catalyst is adjusted responsive to the temperature of the catalyst in the regeneration zone.

Further, the present invention provides means for passing at least a part of the fresh or unused catalyst into said hot surge zone. The amounts of fresh catalyst being passed into the regeneration zone and into the hot surge zone, when it is desired to pass some to both zones, are determined and controlled responsive to the temperature in the regeneration zone.

In a more specific concept, means are provided for correlating the amount of fresh or unused catalyst passed into the hot surge zone with the amount of hot catalyst being passed there into. Thus, when temperature in the regeneration zone is tending to rise and more used catalyst is passed to the hot surge zone, there tending to release heat of combustion, more fresh, lower temperature catalyst can be passed to the hot surge zone as at least a partial offset to the additional heat there being released.

Also, according to the present invention, there is provided an apparatus for the control of the temperature of regeneration of a fluidized mass of particles, e.g., a spent oil cracking catalyst, by controlling the level of the dense phase of the bed of fluidized particles as follows: maintaining a circulation of catalyst from the regeneration zone to a hot particles surge zone and from said surge zone back to the regeneration zone, maintaining a cooling heat exchanger partially immersed in said bed within said regeneration zone, supplying coolant to said heat exchanger, determining continually the temperature of the bed in said regeneration zone, maintaining circulation to said surge zone from said regeneration zone responsive to level in said regeneration zone and adjusting the level maintenance in said regeneration zone responsive to changes in the temperature of the bed in said regeneration zone in a manner such that when the temperature in said zone tends to rise less particles will pass to the surge zone from said regeneration zone and vice versa.

Also, still according to the invention means are provided to control the return of catalyst to the regeneration zone from the hot surge zone and to adjust or aid in adjusting the level of catalyst in the regeneration zone by reducing the rate of return flow when temperature in the regeneration zone tends to rise, and vice versa.

Further, according to the invention, there is provided in the regeneration zone or vessel a stacked series of cooling zones or coils into each of which there can be passed steam and/or water, at least one coil of said stacked coils being immersed in said dense phase in said regeneration zone and being fed water when operative and at least another coil being fed steam when two coils are being employed for cooling purposes and when temperature rise is experienced and bed level tends to rise cutting out steam from the coil being fed steam and substituting at least part of the steam with water to increase the cooling capacity of the stacked coils.

According to the invention, also, means are provided to composite two or more of the operations which are thus simultaneously in operation to achieve cooling and therefore temperature control and fairly steady level of the dense phase bed in the regenerator notwithstanding the fact that incoming particulate material to the regeneration zone, say, as in regeneration of cracking catalyst may have an unusually large deposit of carbon or coke to be burned off and may be therefore generating unusually large amounts of heat, requiring rapid adjustment of heat removal, and vice versa.

The following is now given to more fully explain the invention described herein and to more fully enable one skilled in the art to practice the same. The invention will now be again described with the aid of the drawing in which FIG. 1 depicts diagrammatically an embodiment in which there is the continuous circulation of particles from the regeneration zone to the surge zone and back again and in which the amount of particles circulated to the surge zone from the regeneration zone is adjusted according to temperature of the particles in the regeneration zone and other features, as herein described and wherein FIG. 2 shows an embodiment of the concept wherein several coils are stacked and to which there can be fed water and/or steam as may be needed to effect the desired cooling.

Figure 2:
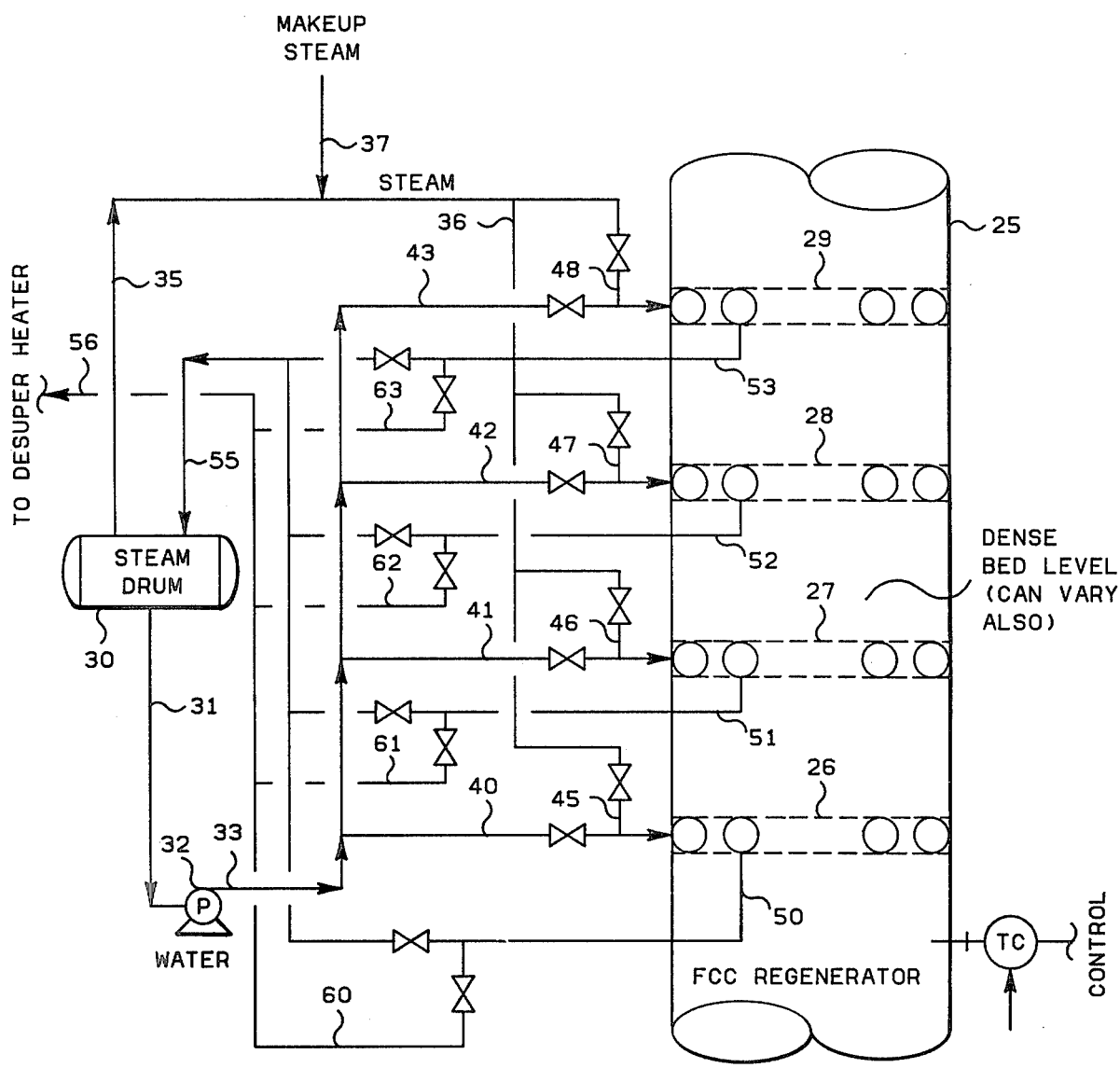

Referring now to FIG. 1, in which regeneration of catalyst from a fluidized catalytic cracking of hydrocarbons, and therefore having coke or a carbon layer deposited thereon, is being regenerated, the spent catalyst enters at 1 into riser 2 through which it is elevated by air entering at 3. A dense phase of a fluidized catalyst undergoing regeneration is maintained at 4 in regeneration vessel 5. Flue gases are taken overhead at 6. Catalyst undergoing regeneration is taken from vessel 5 by 7 and valve 8 into riser 9. Air supplied at 10 lifts the catalyst into hot surge zone or chamber 11. Catalyst is taken from surge zone 11 by 12 and valve 13 and, with added air entering at 14, is passed by 15 back to regeneration zone 5. A level controller (LC) 16 senses and adjusts the dense phase bed level in vessel 5 responsive to a set point and does this by operating valves 8 and 13 to circulate or to flow more or less catalyst in 9 and 15, respectively, although the catalyst is continuously circulated, into vessel 5 from vessel 11 and from vessel 5 to vessel 11. A temperature actuated controller station 18 is adjusted to recognize undesired changes of temperature in bed 4 in the vessel 5. Controller station 18 can actuate the set point on the level controller 16 accordingly. Also, it can recognize other factors as evident herein.

Still referring to FIG. 1 it will be seen that the temperature controller station 18 can reset the level controller 16 to so operate valves 8 and 13 as to increase the level of the bed when more catalyst is needed to in effect avoid undue sudden rise in temperature thereof by immersing more of the cooling coil and also by increasing the amount of now relatively cooler catalyst coming from the surge zones to the regeneration vessel and vice versa. Thus, the rates of flows in 9 and 15 need not always be the same.

In additional modifications, the invention further provides passing by 23 a portion of spent catalyst from reactor to the surge zone 11. This flow is controlled from station 18, responsive to the temperature in the regenerator 4, by valve 24.

Likewise, fresh or makeup catalyst is passed from fresh catalyst storage 19' by 19 to regenerator 5 and/or to surge zone 11 by 21. Valves 20 and 22 are controlled by station 18.

Thus, when temperature in dense bed 4 is tending to rise, station 18, dually programmed, will optionally direct increased flow of reactor spent catalyst by 23 to surge zone 11. Further, station 18 will, optionally, direct fresh or storage catalyst 19' by 19 and valve 20 to riser 2 and thence to regenerator 5. Also, optionally, station 18 will direct catalyst from storage by 21 and valve 22 to surge zone 11.

By splitting the reactor or spent catalyst through valve 24, when temperature tends to rise in the regenerator, less carbonaceous material will be found at such moment in the regenerator, tending thusly to reduce amount of heat being created.

Also, the flow of storage catalyst entering the regeneration by 19 and 2 will tend to cool the bed therein.

Further, still, flow of fresh or storage catalyst entering zone 11 will tend to cool the catalyst therein, thus at least in part offsetting heat which may be there generated by the reactor catalyst flowing thereinto.

One skilled in the art, in possession of this disclosure, having studied the same, will understand that the flow or flows are suitably to be altered when temperature is falling, generally any flow obtaining will be stopped, reduced or increased, as needed.

Further, flow or flows here described to be controlled by station 18 through valves 20, 22 and 24 can be intermittent or continuous.

The earlier circulation of dense phase catalyst from regenerator 5 to surge zone 11 and from zone 11 to vessel 5 will be simultaneously controlled to produce in vessel 5 a desired level of the dense phase bed.

Thus, station 18 will sense what it is doing with the respective valves and will adjust the set on LC 16 accordingly.

Surge 11 thus is made to act to receive and to deal with excessive heat or lack of sufficient heat which can adversely affect the regeneration of the catalyst in zone 5.

Oil to be cracked is charged via 60 and regenerated catalyst via 61 to the reactor not shown. The catalyst-to-oil weight ratio is set as shown.

Therefore, the invention, in the modifications described provides an increased flexibility and efficiency of controlled operation, not hereto fore disclosed.

Referring now to FIG. 2, there are shown in a regenerator vessel 25 a series of coils; 26, 27, 28, and 29. Each of these coils can be supplied from steam drum 30 with water taken from the drum by 31 and pumped by pump 32 into manifold 33 or these coils can be supplied with steam taken from drum 30, by steam line 35, and passed into manifold 36. Make up steam can be added to the system, as desired, by 37.

For sake of brevity, this description will not detail the positions of the various valves. Suffice to say here, to one skilled in the art having studied this disclosure, that valves will be adjusted responsive to temperature to pass water into one or more of coils 26, 27, 28 and 29 or to pass steam into one or more of said coils as needed. The point of the arrangement, as will be understood upon studying the same, is that as additional cooling is needed in a coil, rather than have steam in it, water will be added to it.

The valves can be arranged so that steam valves shut entirely when water valves open or the valves can be arranged to gradually exchange flow of steam for flow of water and vice versa. Water and/or steam or an admixture can be used in coils 26, 27, 28, and 29.

Water is fed to the coils respectively through pipes 40, 41, 42, and 43 respectively. Steam is fed to the respective coils through pipes 45, 46, 47, and 48. The return from the respective coils is by way of pipes 50, 51, 52, and 53 respectively. As shown, some or all of the returned steam, and any condensate, can enter steam drum 30 by way of pipe 55 at the top thereof or, as needed or desired, some of the fluid from pipes 50, 51, 52, and 53 can be passed into pipe 56 and from the system making use of by-pass pipes 60, 61, 62, and 63.

The compositing or combination of the operations of FIG. 1 and FIG. 2, according to the invention, permits excellent control of the regeneration bed temperature and therefore to obtain the best reactivation of, say, a catalyst without injury to the same.

Reasonable variation and modification are possible within the scope of the foregoing disclosure, drawing, and the appended claims to the invention the essence of which is that there has been set forth an apparatus for the regeneration of a particulate mass in a fluidized bed in a regeneration vessel or zone to which and from which there is continuously cycled a mass of particles being regenerated making these available instantly to the regeneration zone or making it possible to take some of these particles from the regeneration zone so as to adjust the level therein according to tendency for temperature change, as described; that fresh or unused particles, e.g., catalyst, can be fed into the regeneration zone and/or into a hot surge zone alone or together with used particles to be regenerated, or the used particles can be passed into the regeneration zone and into the hot surge zone without the fresh or unused particles, also as described; and that there has been provided also in said regeneration zone an arrangement of cooling entities or pipes into which there can be fed as desired water and/or steam and, further, that more than two operations as herein described can be combined to permit operation of a regeneration zone at a substantially constant temperature and/or level of dense phase bed, which is desirable, and in any event without considerable changes in level.

I claim:

1. An apparatus comprising a regeneration vessel means, means for maintaining in said regeneration vessel means a dense phase bed of a mass of fluidized particles and means for controlling the temperature of a regeneration thereof at an elevated temperature, said apparatus also comprising an auxiliary surge vessel means, means for maintaining in said surge vessel means a dense phase bed of a mass of said particles, means for continuously and directly circulating a mass of particles from within each of said beds in said regeneration vessel means, and in said surge vessel means, to within the bed of the other vessel means, means for sensing the temperature within said regeneration vessel means and means responsive to said temperature sensing means for controlling the temperature within the bed of said mass of said particles in said fluidized bed in said regeneration vessel means, by increasing the level of the bed in said regeneration vessel means when the temperature therein is tending to rise, said means for controlling comprising means for and adjusting the circulation of particles between said vessels to build up the level in said regeneration vessel means, and vice versa when the temperature therein is tending to fall.

2. An apparatus according to claim 1 wherein there are provided disposed in said regeneration vessel in that portion of the vessel normally containing said dense phase bed of said particles cooling means and means responsive to said temperature sensing means for separately operating said cooling means in said regeneration vessel and wherein a cooling medium is supplied to each of said cooling means responsive to the temperature in said bed.

3. An apparatus according to claim 1 wherein means responsive to said temperature sensing means are provided for passing unused or regenerated particles from a storage at a temperature below that normally obtaining in a regeneration zone into said regeneration vessel responsive to temperature therein, more particles being passed as temperature tends to rise, and vice versa.

4. An apparatus according to claim 1 wherein means responsive to said temperature sensing means are provided for passing unused or regenerated particles from a storage at a temperature below that normally obtaining in said surge vessel into said surge vessel responsive to the temperature in said regeneration vessel, more particles being passed to said surge vessel as temperature in said regeneration vessel is tending to rise and vice versa.

5. An apparatus according to claim 1 comprising means responsive to said temperature sensing means to control the rate of flow of said mass of particles to be regenerated in said regeneration vessel to said surge zone to increase said rate whenever the temperature in said regeneration vessel is tending to rise and vice versa.

6. A apparatus according to claim 5 wherein there are provided means for flowing to both the regeneration vessel and to the surge vessel separate portions of the particles to be regenerated and for adjusting the relative rates of flow of said particles, to each of said vessel, responsive to the tendency of the temperature in said regeneration vessel to vary, in a manner to pass more particles to the surge vessel when the temperature in the regeneration vessel is tending to rise, and vice versa.

* * * * *